United States Patent [19]

Bikson et al.

[11] Patent Number: 5,067,971
[45] Date of Patent: Nov. 26, 1991

[54] PROCESS FOR DEHYDRATION OF GASES AND COMPOSITE PERMEABLE MEMBRANES THEREFOR

[75] Inventors: Benjamin Bikson, Brookline; Salvatore Giglia, Norwood; Joyce K. Nelson, Lexington, all of Mass.

[73] Assignee: Union Carbide Industrial Gases Technology Corporation, Danbury, Conn.

[21] Appl. No.: 609,625

[22] Filed: Nov. 6, 1990

Related U.S. Application Data

[63] Continuation of Ser. No. 478,681, Feb. 12, 1990, abandoned.

[51] Int. Cl.$^5$ .................. B01D 53/22; B01D 71/68
[52] U.S. Cl. .................................... 55/16; 55/68; 55/158
[58] Field of Search ....................... 55/16, 68, 158

[56] References Cited

U.S. PATENT DOCUMENTS

| | | |
|---|---|---|
| 3,467,604 | 9/1969 | Michaels . |
| 3,709,841 | 1/1973 | Quentin . |
| 3,735,558 | 5/1973 | Skarstrom et al. ............. 55/16 |
| 3,735,559 | 5/1973 | Salemme ........................ 55/16 |
| 4,029,582 | 6/1977 | Ishii et al. ..................... 55/16 X |
| 4,230,463 | 10/1980 | Henis et al. .................... 55/16 |
| 4,238,204 | 12/1980 | Perry ............................ 55/16 |
| 4,367,135 | 1/1983 | Posey, Jr. ...................... 55/16 X |
| 4,406,673 | 9/1983 | Yamada et al. ................ 55/16 |
| 4,414,368 | 11/1983 | Coplan et al. ................. 525/534 |
| 4,497,640 | 2/1985 | Fournie et al. ................ 55/16 |
| 4,666,644 | 5/1987 | Watson ........................ 55/16 X |
| 4,714,725 | 12/1987 | Hendy et al. .................. 524/108 |
| 4,717,395 | 1/1988 | Chiao ........................... 55/16 |
| 4,718,921 | 1/1988 | Makino et al. ................. 55/16 |
| 4,728,429 | 3/1988 | Cabasso et al. ................ 210/638 |
| 4,783,201 | 11/1988 | Rice et al. .................... 55/16 |
| 4,793,830 | 12/1988 | Murphy et al. ................ 55/16 |
| 4,826,599 | 5/1989 | Bikson et al. ................. 55/16 X |
| 4,857,081 | 8/1989 | Taylor ......................... 55/16 |
| 4,875,908 | 10/1989 | Kikukawa et al. ............. 55/16 |
| 4,881,954 | 11/1989 | Bikson et al. ................. 55/16 |
| 4,881,955 | 11/1989 | Bikson et al. ................. 55/16 |
| 4,900,626 | 2/1990 | Fabre ........................... 55/16 X |
| 4,981,498 | 1/1991 | Bikson et al. ................. 55/68 X |

FOREIGN PATENT DOCUMENTS

3321860 12/1984 Fed. Rep. of Germany .

OTHER PUBLICATIONS

Asaeda et al., "Experimental Studies of Dehumidification of Air by an Improved Ceramic Membrane", J. of Chem. Eng. of Japan, 19, No. 3, 238–240 (1986).
Xigao Jin et al., British Polymer Journal, 17, 4–10 (1985).
Norman Li, "Membrane Separation Processes in the Petrochemical Industry", DOE/ID/12422-TI (DE85017030), 12/15/84.

*Primary Examiner*—Robert Spitzer
*Attorney, Agent, or Firm*—Alvin H. Fritschler

[57] ABSTRACT

Process for the dehydration of gases using composite permeable membranes, preferably hollow fiber composite membranes comprised of a porous support coated with an ultrathin layer of a defined sulfonated polysulfone or sulfonated polyether ketone. The processes also contemplate the use of a sweep or purge gas on the water-enriched permeate side of the composite membrane to increase the efficiency of the dehydration process.

56 Claims, 1 Drawing Sheet

FIG. 1

PROCESS FOR DEHYDRATION OF GASES AND COMPOSITE PERMEABLE MEMBRANES THEREFOR

FIELD OF THE INVENTION

This invention comprises a process for the dehydration of gases containing water vapors and composite permeable membranes therefor. The composite membranes of this invention are comprised of a thin separation layer of certain sulfonated polysulfone polymers and certain sulfonated polyether ketones coated on a porous support.

DESCRIPTION OF THE PRIOR ART

Numerous processes are currently used commercially for the dehydration of water vapor containing gas mixtures, such as natural gas, air and others. These processes include refrigeration or cooling to condense the water vapor, dehydration by adsorption in silica gels or other adsorbents, and dehydration over molecular sieves. These, and many other techniques, are well known in the art.

Recently, procedures have been disclosed that may be more economical on a small-scale and are less space inclusive based on the use of permeable membranes to dehydrate gases. It is known that water vapors generally permeate faster through separation membranes than most other gases and thus dehydration can be effectively carried out by ermeation through membranes. The prior art has disclosed the use of porous inorganic and polymeric organic membranes, as well as asymmetric and composite membranes with porous or non-porous active separation layers for dehydration of gas mixtures.

In an article published by M. Asaeda, L. D. Du and K. Ekeda, J. of Chem. Eng. of Japan, 19, No. 3, 238–240 (1986), there is disclosed a method for dehumidification of air using thin porous membranes of silica-alumina deposited on the outer surfaces of coarse Porous ceramic cylinders. This particular article reports the results obtained by Asaeda, et al, using improved ceramic membranes and compares them to the results achieved in previous work.

U.S. Pat. No. 4,783,201, issued Nov. 8, 1989 to A. W. Rice and M. K. Murphy, relates to the dehydration of gases using membranes formed of polymeric materials having transport selectivity for water vapor versus the feed gas of at least 1000% and a controlled pore size. As stated at column 6, lines 6 et seq., the membranes are unique asymmetric, uncoated membranes of controlled and selected pore size in the skin layer; these can be in hollow fiber form and can be post-treated to reduce porosity.

U.S. Pat. No. 4,497,640, issued Feb. 5, 1985 to F. J. C. Fournie and C. J. A. Deleuze, discloses a process for dehydrating gases containing hydrocarbons using a permeator that comprises a feed compartment and a permeation compartment separated from each other by a membrane of selective Permeability. The permeator comprises a bundle of hollow fiber membranes. The membranes are comprised of an active layer and a substrate, which are specifically defined. The moisture containing gas feed is fed into the inlet of the feed compartment coming into contact with the exterior surface of the hollow fibers, dehydrated gas is recovered from the outlet of the feed compartment, and water-enriched 9as is withdrawn from the permeation compartment, that is the interior bores of the hollow fibers. The preferred Polymers specifically disclosed in this patent are identified at column 4, lines 51 to 56 as polyamides or cellulose-based polymers. The patent also indicates the membrane essentially should have a water/methane selectivity factor of more than about 100. Nowhere in this reference is there a disclosure of a composite membrane in which the separation layer consists of an ultrathin layer of a sulfonated polysufone or sulfonated polyether ketone.

U.S. Pat. No. 4,718,921, issued Jan. 12, 1988 to H. Makino and N. Nakagawa, disclosed a process for removing water that comprises adding a drying (sweep) gas to the permeate component side of the membrane surface. This drying gas can be a portion of the recovered non-permeated component having a reduced water content compared to the water content of the original feed. The permeable membrane is made from an aromatic polyimide polymer that has a water vapor permeation ratio of water/methane of 200 or more.

It is known in the art that hydrophilic polyelectrolyte resins have improved water vapor permeation characteristics Thus in U.S. Pat. No. 3,467,604, A. S. Michaels describes preparation of moisture permeable poly-ion complex resinous compositions. The polyelectrolyte resins described by A. S. Michaels are prepared by dissolving both linear polymers containing anionic and cationic groups in a solvent media containing ion shielding electrolyte and recovering the ionically crosslinked polyelectrolyte resin by reducing the activity of the shielding electrolyte. Highly porous polyelectrolyte resins described by A. S. Michaels differ from those of the present invention. Nowhere in this reference is there a disclosure of a composite membrane in which the separation layer consists of an ultrathin layer of a sulfonated polysulfone or sulfonated polyether ketone.

U.S. Pat. No. 3,735,559, issued May 29, 1973 to R. M. Salemme, disclosed the use of sulfonated polyxylylene oxide membranes for the separation of water vapor from other gases. The permeators disclosed in this patent comprise modules of plate and frame type.

U.S. Pat. No. 4,728,429, issued Mar. 1, 1988 to I. Cabasso and E. Korngold, discloses a pervaporation process for dehydrating organic liquids based on sorption, diffusion and dissolution through a membrane. The improvement claimed in this patent is the use of sulfonated ion-exchange poly alkylene (polyalkene) membranes, particularly sulfonated polyethylene-based ion exchange membranes. The authors indicate at column 2, beginning at line 18, the inadequacy of a large number of membrane materials for the removal of water from mixtures. This listing identified several materials, e.g., PTFE and polysulfone as membrane materials of little or no practical utility.

The majority of membrane drying processes described in the art perform the gas drying by permeation with substantial product loss. The water vapor on the permeate side of the drying membrane can quickly reach the saturation, at which point water permeation ceases. To prevent this condition from taking place, a substantial amount of gas is frequently allowed to permeate together with moisture to reduce water vapor pressure on the permeate side. The product gas losses, as a result, are very high and frequently as high as 20 to 30 percent of that of the dry product, particularly if product gas with a low dew point is required. A drying process that can alleviate this product loss requires the use of a sweep gas to be introduced in a countercurrent direction to that of the feed gas on the permeate side of the membrane. The sweep gas can comprise a portion of the dry product gas or a dry waste gas, if available drying with a sweep gas is more economical and is characterized by less product loss than drying by permeation only. The process is most economical when the separation factor of the drying membrane (e.g., water vapor gas) is high, preferably above 1,000 and most preferably above 5,000. It presently was found that composite membranes prepared from specific sulfonated polysulfones and sulfonated polyether ketones exhibit very high water vapor permeation rates combined with excellent water vapor/air or water vapor/natural gas separation factors that are substantially higher than once reported in the prior art.

Sulfonated polysulfone materials and their use as gas and liquid separation membranes are well known in the art. For example, in U.S. Pat. No. 3,709,841, Quentin disclosed preparation of sulfonated polyarylether sulfones and their use in liquid based separations, such as desalination and as ion exchange membranes. Improved methods of preparation of polyarylether sulfones and reverse osmosis and ultrafiltration membranes thereof are further disclosed in U.S. Pat. Nos. 3,855,122; 3,875,096; 4,054,707; and 4,207,182, incorporated herein by reference.

Sulfonated polyether sulfones and sulfonated polyether-ether sulfones and reverse osmosis and ultrafiltration membranes thereof are disclosed in U.S. Pat. Nos. 4,414,368; 4,508,852; 4,268,650; and 4,273,903, also incorporated herein by reference.

Methods of preparation of sulfonated polyether ketones and salts thereof can be found in articles by Xigao Jin et al., British polymer Journal, V17, p.4–10, (1985).

Preparation of asymmetric sulfonated polyether ketone reverse osmosis membranes from sulfonated polyether ketones is described in U.S. Pat. No. 4,714,725; preparation of ultrafiltration membranes from sulfonated polyether ketones is described by P. Zschocke in West German patent application DE No. 3321860 A1.

The use of sulfonated polysulfones for specific gas separation processes has been reported as well. For example, sulfonated polysulfone materials have been proposed for separation of carbon dioxide from light hydrocarbons. C. C. Chiao in U.S. Pat. No. 4,717,395 has disclosed the use of sulfonated polyether sulfones for carbon dioxide light hydrocarbon separation, as well as for $O_2/N_2$ separation. In the report to the DOE entitled "Membrane Separation processes in the petrochemical Industry, Phase I", from Signal UOP Research Center, Norman N. Li, principal investigator, DIE/ID/ 12422-T1 (DE No. 85017030), Dec. 15, 1984, pages 59–60, good $CO_2/CH_4$ separation factors were reported for sulfonated polysulfone in both hydrogen and sodium ionic forms.

We have discovered currently that certain sulfonated polysulfones and sulfonated polyether ketones in the form of thin layer composite membranes unexpectedly and unpredictably display superior water vapor permeation/separation characteristics. The membranes of this invention were found to have water/air and water/natural gas separation factors above 1,000 and frequently above 5,000, which is substantially higher than reported for composite or asymmetric membranes of prior art. This makes the composite membranes of this invention uniquely suitable for gas dehydration applications with minimum product loss that frequently can be less than one percent.

SUMMARY OF THE INVENTION

This invention pertains to permeable composite membranes, preferably hollow fiber composite membranes, useful for the dehydration of gases and to processes for the dehydration of gases using said membranes. The composite membranes comprise a porous support coated with a thin layer of a sulfonated polysulfone polymer or a sulfonated polyether ketone as the separation barrier.

According to the invention, the sulfonated aromatic polymer separation barrier of the composite membrane contains the unit:

where Y is $-SO_2-$ and/or $-CO-$; and Ar is a divalent aromatic radical, which may differ from unit to unit in the polymer chain, and wherein a fraction of Ar groups carries at least one $-SO_3H$ group or the salt thereof.

Ar may be mono- or polyaromatic, for example, meta- or paraphenylene or biphenylene and preferably contains at least two or more aromatic rings linked together by, particularly, $-O-$, $-S-$, $-SO-$, $-SO_2-$, $-CO-$, a divalent substituted or unsubstituted aliphatic hydrocarbon radical Or a residue of diol.

For the purpose of this description, the invention is described in more detail using the sulfonated polysulfone membrane materials containing in the chain of the polymer molecule the unit:

said polymers being more fully described below. It is recognized that the sulfonated polyether ketones contain in the chain of the polymer molecule the unit:

One preferred class of sulfonated polysulfone membranes are the composite semipermeable sulfonated polysulfone membranes comprising a porous support and a polymer containing unsubstituted or substituted units of the following structure (IV) in which some of the aromatic rings of unit (IV) have been sulfonated:

(IV)

wherein R and R' are the same or different and represent an alkyl group having from 1 to about 4 carbon atoms, preferably 1 carbon atom or a halogenated alkyl group, preferably a fluorinated alkyl group; and wherein $S_m$ is as hereinafter defined and which has an average degree of sulfonation per unit (IV) of from about 0.2 to about 2. By the term degree of sulfonation is meant that on average from about 0.2 to about 2 sulfonic groups per unit (IV) are present; preferably from about 0.4 to about 1.5 sulfonic groups per unit (IV) are present.

THE DRAWING

FIG. 1 shows tubesheet 9 with a slot or notch cut, a straight cut, or any other cut is equally suitable.

DETAILED DESCRIPTION OF THE INVENTION

The processes of this invention and the composite membranes used in said processes provide means for removing water vapor from a water vapor-containing gas in an essentially highly efficient manner. This invention provides a process employing composite membranes with very high water vapor separation factors combined with high water vapor permeation rates. The composite hollow fiber membrane is one in which the separation barrier consists essentially of an ultrathin layer of a sulfonated polysulfone or a sulfonated polyether ketone supported on a porous hollow fiber support, preferably a porous polysulfone hollow fiber support, which is sufficiently porous so it does not prevent mixing of the permeate gas with a "sweep" gas. The term "sweep" gas has an established meaning in this art; it is, also, often referred to as the "purge" gas.

In many conventional permeation dehydration processes, water vapor-containing gas is fed at an elevated pressure to one side of the membrane. The water vapor is selectively removed by the membrane and is carried away as a lower pressure permeate component stream. The gas that has not permeated has a reduced water vapor content and is recovered as a separate component stream. One of the disadvantages most often encountered in the known procedures is that a significantly large amount of the desired gas is lost to the permeate component stream.

It is generally known that water will permeate faster than other gases through most membranes. This more rapid permeation results in the development of a water vapor-saturated gas on the permeate side of the membrane. Once the saturation point of the permeate has been reached, there is little or no driving force to continue the permeation of water, and specific measures are required to ensure additional adequate water vapor removal. In the past, these measures can and usually result in losses of up to about 30% of the desired gases into the permeate compartment to reduce water vapor pressure below the saturation point so as to maintain adequate water vapor flux, a highly uneconomical waste. The processes of this invention reduce such losses to a considerable extent, to less than about 10%, and frequently to less than 1%. It should be pointed out, however, that the composite membranes of this invention can be prepared as to be operated in a dehydration process by permeation only. This might be acceptable economically in certain drying applications despite higher product losses, particularly when the gas drying requirement is not extensive.

The remarkable reduction in product loss is accomplished through the use of highly selective composite membranes of this invention and introduction of a dry sweep or purge gas on the permeate side of the membrane. This purge gas reduces the water vapor content on the low pressure or permeate side of the membrane and, consequently, increases the efficiency of the dehydration process. For maximum efficiency of the drying process, it is important that the permeating gases mix radially with the sweep gas with essentially little or no axial mixing taking place, the axial mixing is also most undesirable on the feed side, while conditions on the feed side should be maintained to prevent concentration polarization. In practice, however, the radial mixing is frequently difficult to achieve with composite or asymmetric membranes because of the resistance to radial mixing by the porous support layer that typically impedes the radial mixing. This invention provides a process that uses composite membranes in which the porous support layer essentially does not prevent radial mixing on the permeate side of the membrane. In the process of this invention a countercurrent flow is maintained between the feed and the permeate and is critical and important for optimal performance. However, it should be noted that under some rare circumstance cocurrent flow might be suitable, but in essentially all instances countercurrent flow direction is the desired operating mode. Coupled with the counter-current flow is the radial mixing in the porous substrate. However, axial mixing at either the feed or permeate side of the membrane is undesirable, as well as any channeling or bypassing of the gas flow in membrane modules.

The semipermeable gas separation membrane used in the process of this invention comprises a composite membrane prepared by deposition of a coating of a sulfonated polysulfone or a sulfonated polyether ketone on a porous support. For example, sulfonated polysulfone polymer containing unit (IV) is deposited on porous polysulfone substrate. The invention also comprises processes for using such semipermeable composite membrane for dehydrating water vapor-containing gas mixtures.

In the dehydrating process, the temperature can vary from above 0° C. to about 50° C. It was found that the dehydration efficiency generally increases with decrease in temperature with no deleterious effect on permeation rate. Thus, operation at lower temperatures might be more economical under certain conditions.

Sulfonated polysulfone polymers containing the sulfonic acid group in the polymer molecule used to produce the coating of semipermeable material on the porous support are represented by general formula (I).

wherein A, B, D, and E are unsubstituted or substituted arylene groups and, most preferably, p-phenylene or m-phenylene, with at least one A, B, D, E group in the polymer chain repeat unit (I) substituted with a free sulfonic acid group or its salified form; n represents the number of repeat units (I) within the average molecular weight of the polymer molecule, the average molecular weight being, generally, above about 10,000, preferably from about 25,000 to about 80,000; and c, d, and e are integers having a value of from zero to about 6, preferably from about 1 to about 2; R and R' are the same or different and represent an alkyl group having from 1 to about 4 carbon atoms, preferably 1 carbon atom, or a halogen alkyl group, preferably a fluorinated alkyl group. The extent of sulfonation of the polymer repeat unit (I) is defined as the degree of substitution. The symbol -S is the sulfonic acid group or its salified form and m represents the degree of sulfonation in the repeat unit (I), as previously defined. The counter ions forming the salified form of the sulfonic group can be the ammonium group, an alkali metal atom, such as lithium, sodium, potassium, etc., an alkaline earth metal atom such as calcium, magnesium, etc., a transition metal atom (in particular zinc, copper, cobalt, nickel), or an organic salt-forming group, for example, primary, secondary, tertiary, or quaternary amines; these forms being known to the skilled chemist. As previously indicated, the degree of sulfonation can be from about 0.2 to about or higher, preferably from about 0.4 to about 1.5. Thus if one sulfonic acid group is attached to each repeat unit (I) in the polymer chain, the degree of sulfonation is 1; if one sulfonic acid group is attached to an average of 5 repeat units (I) in the polymer chain, the degree of sulfonation is 0.2.

In addition, one can use (a) sulfonated polysulfones in which the repeat unit has the general formulas:

(II)

and (III)

or (b) the sulfonated polyether ketones in which the repeat unit in the chain has the general formula:

(V)

wherein -S is a sulfonic acid group (SO$_3$H) or a salt thereof; and m is a positive value and represents the degree of sulfonation in the repeat unit, as previously defined.

Any sulfonated polysulfone or sulfonated polyether ketone having the defined degree of sulfonation can be used that has a water/gas separation factor above 200, preferably greater than about 1000 and most preferably greater than about 5000. The "gas" can be a single gas specie or a mixture of gases, e.g., air, carbon dioxide/methane, carbon dioxide/light hydrocarbon mixtures, carbon monoxide/carbon dioxide/methane, etc., that contains water vapor; any water/gas mixture can be dehydrated by the process of this invention.

For the purpose of more fully describing and explaining the invention, a composite membrane comprising porous hollow fiber polysulfone support coated with an extremely thin layer of sulfonated polysulfone of formula (IV) is discussed below. However, the invention is not limited to this specific structure, its scope being to the extent described in this document. Consequently, in light of the above comments and in accordance with this invention, semi-permeable composite membranes coated with an extremely thin layer of the sulfonated polysulfone moieties of general formula (IV) as the recurring unit are used in the dehydration process and permeators of this invention.

Sulfonated polysulfone polymers can be prepared by sulfonation methods known in the art; see, for example; U.S. Pat. No. 3,709,842, wherein Quentin describes a preparation of polymers in which part of the aromatic rings are substituted with hydroxysulfonyl radicals (—SO$_3$H, also called sulfonic groups). Additional sulfonation methods can be found in E. E. Gilbert, "Sulfonation and Related Reactions", R. E. Krieger publishing Co., N.Y. (1977) and A. Noshay and L. M. Robeson, J. of Applied polymer Science, V20, p.1885 (1976). In general, the sulfonation may be carried out by a simple admixture of a solution or suspension of the polysulfone with a sulfonation agent in an inert solvent system. Sulfur trioxide, chlorosulfonic acid and oleum are representative sulfonation agents. An advantageous temperature is within the ranges of from −25° C. to +80° C., preferably from 0° C. to +50° C. The sulfonated product polymer is usually separated from the reaction mixture by conventional techniques such as filtration, washing and drying.

Some sulfonated polysulfone products useful in this invention are shown as having sulfonate groups on the phenyl moiety distal to the sulfone linking group. Although substitution at these locations theoretically occurs first, it will be appreciated by those skilled in the art that the sulfonate group may substitute at other positions and in other phenyl moieties of the polymer chain during sulfonation.

The sulfonated polysulfone polymers having units of formula (I) are known, as previously referred to. What now has been discovered is that when these sulfonated polysulfones are coated in extremely thin layers on porous polysulfone substrate materials, in particular hollow fibers, composite membranes are produced having unexpected good selectivity and high permeation rates for the dehydration of water vapor-containing gases. The porous polysulfone substrate material can be isotropic or anisotropic. In one embodiment of this invention, it is an anisotropic polysulfone hollow fiber, in another embodiment, the polysulfone hollow fiber is substantially isotropic, with the hollow fiber surface porosity generally being preferably above 10$^{-2}$. Surface porosity is defined as an area of surface occupied by pores divided by the total surface area. The size of the surface pore is generally below one micron and most preferably below 0.5 micron. The sulfonated polysulfone is coated on the polysulfone hollow fiber from a solution by procedures known to these skilled in the art to produce a composite membrane.

The production of porous polysulfone hollow fibers is well known. For example, they can readily be produced by procedures similar to those described by I. Cabasso, "Hollow Fiber Membranes", Kirk-Othmer: Enc. of Chem. Tech., 12, Third Ed., 492–518 (1980) and I. Cabasso, "Membranes", Enc. of pol. Sci. and Eng., 9, Second Ed., 509–579 (1987), incorporated herein by reference.

Advantageously, the walls of the porous polysulfone hollow fibers are sufficiently thick so that no special apparatus would be required for their handling and they can be conveniently formed into cartridges. The outside diameter of the porous polysulfone hollow fiber can vary from about 1 mil or less to about 100 mils or more, preferably from about 10 mils to about 80 mils. The wall thickness of the porous polysulfone hollow fiber can vary from about 0.1 mil to about 25 mils or more, preferably at least about 0.2 mil up to about 20 mils. The spun polysulfone fibers are generally considered to be substantially isotropic, however, some degree of asymmetry is usually present.

In order to provide a desirable flux, the walls of the porous polysulfone hollow fibers are made to contain substantial void volume. Voids are regions within the walls of the polysulfone hollow fibers that are vacant or devoid of the polysulfone. Thus when voids are present, the density of the polysulfone hollow fiber is less than the density of the polysulfone polymer per se. The void volume of the polysulfone hollow fiber can be as high as about 90 percent, and sometimes about 20 percent to about 70 percent, based on the superficial volume, i.e., the volume contained within the gross dimensions of the polysulfone hollow fiber, excluding the bore volume.

The composite membranes of this invention are advantageously produced by coating the defined sulfonated polysulfones and sulfonated polyether ketones on porous polysulfone substrates commonly utilized in the art of composite membrane manufacturing. The coatings are typically deposited from such common solvents as alcohols, ketones, some typical aprotic solvents, and mixtures of these solvents with water. The sulfonated polysulfone polymers with high degrees of the sulfonic group content are usually more soluble in such common solvents as alcohols and at very high degrees of the sulfonic group content may be soluble in water. The sulfonated polysulfone polymers used in this invention are preferably coated in their respective sulfonic acid forms that are more soluble in common solvent, but the salified forms can be coated directly as well. The composite membranes of this invention are typically prepared by depositing the sulfonated polymers on the exterior surface of the hollow fibers; however, hollow fibers coated on the interior wall can be produced as well.

The sulfonated polysulfones can be used as pure membrane-forming materials, or as an admixture of several sulfonated polysulfones, or in a mixture with other organic or inorganic materials. When not the sole membrane-forming material, the sulfonated polysulfones will typically represent 50 percent or more by weight of the composition of the membrane material and preferably more than about 70 percent by weight of the composition of the membrane material. Some typical examples of inorganic materials that can be used in admixture with the sulfonated polysulfones are the inorganic acids, such as sulfuric or phosphoric acid. Organic materials useful as admixtures with the sulfonated polysulfones can be high molecular weight polymers that are generally neutral, but sometimes can contain ionic groups, e.g., polyethylene glycol, polypropylene glycol, etc., or low molecular weight materials and plasticizers, for example, organic salts, polyhydric alcohols, such as glycerine, low molecular weight amines, such as ethylenediamine, diethylene triamine, acridine, piperazine, pyridine, etc.

If rigorous controls and care are not executed during the composite membrane manufacturing process, residual pores, pinholes, and other defects may occur that could impair final membrane performance. It is well known in the art that membrane post-treating techniques can be effectively utilized to seal these residual defects. The methods particularly useful for post-treating composite membranes are described in U.S. Pat. No. 4,767,422. If defects do occur in the separation layer of the composite membranes, they can be effectively sealed by post-treating the membranes with low concentrations of highly sulfonated polysulfone or other polyelectrolytes dissolved in water, e.g., polyethylene imine, sulfonated polystyrene, etc. or non-polyelectrolytes, e.g., polyvinyltoluene, silicones, etc., dissolved in hydrocarbons.

The porous polysulfone hollow fibers are coated with the sulfonated polysulfone semipermeable coating material of general formula (I) to form a composite membrane. The coating procedure can be carried out by any of the known methods, e.g., as shown in U.S. Pat. No. 4,467,001, incorporated herein by reference. Using the procedure shown in this patent, a solution of the sulfonated polysulfone membrane-forming material of general formula (I) is applied to the surface of the porous polysulfone hollow fiber to deposit a finished dry coating up to about 10,000 Angstroms, preferably from about 500 to about 7,000 Angstroms, most preferably from about 1,000 to about 3,000 Angstroms, adhered to the surface of the porous polysulfone hollow fiber.

The porous polysulfone hollow fibers used in the examples were spun from a ternary solution of commercially available polysulfone Udel P3500, available from Amoco performance products, in a solvent/non-solvent mixture known in the art using the procedures described by I. Cabasso et al. in "Composite Hollow Fiber Membranes" Journal of Applied polymer Science, 23, 1509-1523 and in "Research and Development of NS-1 and Related Hollow Fibers for Reverse Osmosis Desalination of Seawater", PB 248,666, prepared for the Office of Water Research and Technology, Contract No. 14-30-3165, U.S. Department of the Interior, July 1975. The well known tube-in-tube jet technique was used for the spinning procedure, with water at about room temperature being the outside quench medium for the fibers. The quench medium in the central bore of the fiber was air. Quenching was followed by extensive washing to remove pore-forming material. Following the wash, the hollow fibers were dried at elevated temperature and water was removed by passing the hollow fibers through a hot air drying oven.

The composite membranes comprising a porous polysulfone hollow fiber having a very thin coating layer, of the sulfonated polysulfone having units of general formula (I), exhibit good selectivity and permeation rate for the dehydration of water vapor containing gases, as shown below. The composite membranes of this invention show a significantly higher selectivity for the dehydration of gases when compared to the selectivity achieved with conventional membrane materials such as polysulfone, cellulose acetate, etc.

The porous polysulfone hollow fibers used in the examples were about 20 mils outside diameter and about 12-13 mils inside diameter and were produced from a polybisphenol-A ether sulfone (available commercially as P 3500 sold by Amoco performance products) comprising a plurality of repeating units of the formula:

following a procedure similar to that described by I. Cabasso, supra. In this method, the porous polysulfone hollow fibers are basically isotropic and possess high levels of surface porosity most suitable for preparation of composite membranes. The surface area occupied by pores versus the total surface area should be typically higher than $1 \cdot 10^{-2}$ and preferably as high as $10 \cdot 10^{-2}$. However, fibers prepared by dry-wet techniques do possess some gradation of porosity from interior to exterior of the fiber considered in the field to impart some asymmetric characteristics to the hollow fibers.

The composite membranes are used to prepare permeators in any conventional manner. The permeators can be of parallel hollow fiber configuration or of a helically wound configuration. The construction and use of both parallel and helically wound conventional hollow fiber membrane permeator is well known in the art (see, for example U.S. Pat. Nos. 3,499,062; 3,442,002; 3,794,468; 4,207,192; 4,631,128). In practice the permeators are constructed with bore side feed or shell side feed configuration based on ultimate use. Though such permeators can be used in the dehydration process, the preferred permeators are the four port permeators described below, which permit one to obtain superior results in the dehydration process using either bore side or shell side feed flow configurations and countercurrent flow conditions. These four port permeators are illustrated by the structure shown in FIG. 1; they are the subject matter of a separate invention by the same inventors.

Figure 1:
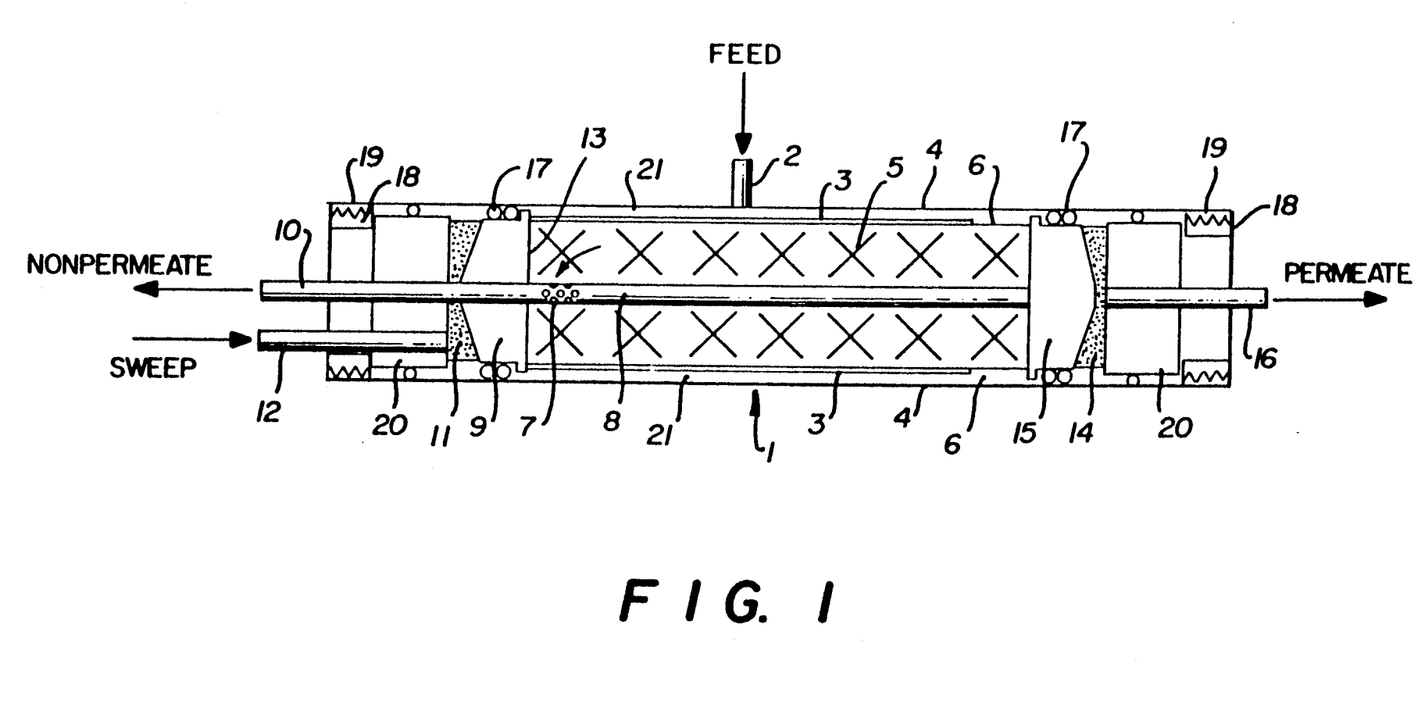
FIG. 1 represents a schematic presentation of a permeator suitable for use in the process of this invention, as is discussed in fuller detail infra. This drawing is representative of but one permeator type and as will be recognized by one of average skill in the art in view of the disclosure in this document is not the sole permeator construction useful in the dehydration process. Though

Referring to FIG. 1, the water vapor containing fluid feed stream enters the permeator 1 via entrance port 2. An impermeable barrier 3 comprising one or more layers of thin film material encasing the bundle of composite hollow fiber membranes 5 (for example, a thin film such as polyethylene or polyvinylidene chloride) forces the fluid feed stream to travel along the annulus 21 between the permeator's pressure shell 4 and film barrier 3. The fluid feed stream initially comes into contact with the exterior surface of the composite hollow fiber membranes 5 at the entrance region 6, said composite hollow fiber membranes comprising porous polysulfone hollow fibers having a very thin coating layer of the sulfonated polysulfone having units of general formula (I). The fluid feed stream flows along the exterior surface of the composite hollow fiber membranes 5 (the composite hollow fiber membranes preferably in the form of a helically wound bundle as described in U.S. Pat. No. 4,207,192) and exits through extraction holes 7 of extraction tube 8. Extraction tube 8 extends through tubesheet 9 allowing the nonpermeating water vapor diminished fluid stream to leave the permeator at nonpermeate exit port 10. Sweep fluid enters the hollow fiber bore openings 11 via entrance port 12. The sweep fluid joins the permeate fluid at the tubesheet face 13, and flows cocurrently through the bores of the hollow fibers with the water vapor enriched permeate fluid and countercurrently to the feed (nonpermeate) stream. The water enriched permeate/sweep fluid mixture exits the hollow fiber bores at bore openings 14, the hollow fiber being embedded in tubesheet 15, and exits the permeator at permeate exit port 16. O-rings 17 act as a fluid tight seal that separates the high and low pressure sides of the permeator, in essence, also separating the fluid feed stream and nonpermeate from the sweep/permeate mixture.

When pressurized fluid feed is introduced on the shell side of the hollow fiber bundle, the pressure force acts against the backside of each tubesheet. If there is no balancing force on the front side to prevent potential deflection of the tubesheets, a physical support in contact with the front side of each tubesheet is employed. In FIG. 1, a threaded ring 18 engages permeator pressure shell 4 by threads 19 (as described in U.S. Pat. No. No. 4,709,831) to retain cylindrical plugs 20 and counterbalance the pressure force. The sweep fluid serves to move the water-enriched permeate out of the module and thus improve the dehydration process. It flows through the module in countercurrent direction to the feed and nonpermeate and in cocurrent direction to the permeate. The sweep gas mixes with the permeate in essentially radial mixing fashion and exhibits essentially no axial mixing on the surface of the porous substrate. The sweep fluid has a moisture content below that of the permeate gas and can originate from any source. For instance, it can be a previously dried gas or it can be a portion of the water-diminished fluid recovered from the permeator 1 through nonpermeate exit port 10 and recycled, by appropriate means, into the permeator via sweep fluid entrance port 12. In some instances, the process of this invention can be effective without a sweep fluid using the sulfonated membranes disclosed. This depends on the gas mixture involved and whether one is willing to accept a lower recovery since it requires the need to permit permeation of more of the desired component to assist in the removal of moisture before the saturation point on the permeate side has been reached.

The following examples serve to further illustrate the invention.

EXAMPLE 1

Part A, Preparation of Sulfonated F6-BisA Polysulfone (F6-SPS)

One hundred twenty five g of F6-Bis A polysulfone (poly[oxy-1,4-phenylenesulfonyl-1,4-phenyleneoxy-1,4-phenylene-[2,2,2,-trifluoro-1-(trifluoromethyl)ethylidene]-1,4- phenylene]) were dissolved in 1,250 ml of methylene chloride in a reaction flask equipped with a mechanical stirrer, thermometer, condenser and nitrogen inlet and outlet. The contents of the reaction flask were cooled to $-4°$ C. and 66.14 g of chlorosulfonic acid dissolved in 337 ml of methylene chloride were added over a period of 45 minutes under nitrogen atmosphere at $-6°$ C. The reaction flask was brought to room temperature, circa 25° C., and the reaction mixture stirred for a total period of about 6 hours. The reaction was terminated, the methylene chloride was decanted, and the precipitate was washed with methylene chloride three times and dissolved in 1,000 ml of ethanol and rotoevaporated. One half of the dry rotoevaporated F6-SPS was dissolved in ethanol-water mixture and dialyzed using conventional cellulose dialysis bags, the dialyzate was rotoevaporated to dryness and dried in a vacuum oven at 70° C. to a constant weight. The thus prepared sulfonated F6-BisA-polysulfone (F6-SPS) had a DS of 0.84 and an ion-exchange capacity of 1.34 meq/g of dry polymer in $H^+$ form.

Part B, Preparation of Composite Hollow Fiber Membrane

Composite gas separation membranes were prepared by coating porous polysulfone hollow fibers with a solution of the F6-SPS in ethanol. The coating solution was prepared by dissolving 1.25 g F6-SPS in 100 cc of reagent alcohol and then filtered through a 1.5 micron glass filter. The polysulfone composite membrane was prepared by passing the dry polysulfone hollow fibers through the coating solution bath essentially as described in U.S. Pat. No. 4,467,001. The solvent was evaporated by passing the fibers through a dryer oven at circa 65° C. with a residence time of 15 seconds.

Part C, Preparation of Permeator

A helically wound hollow fiber membrane permeator was constructed as follows: The hollow fiber cartridge was wound by the procedure described in U.S. Pat. No. 4,207,192 and the overall configuration of the permeator is shown in FIG. 1. In this permeator, the center core tube, extraction tube 8, extends through only one of the modules two tubesheets (either 9 or 15). The center core tube 8 is provided with extraction holes 7, which allow for removal or entrance of either the feed or permeate streams depending on whether the bore side or shell side feed mode is employed.

The module was produced using the composite hollow fiber membranes of part B. The fibers had an outer diameter of about 16.6 mils and an inner diameter of about 11.3 mils. The module had a tubesheet, a potted length of about 10 cm and an active length of about 20 cm. The fiber was helically wound about the extraction tube at an angle of about 25° (a 0° angle is defined as perpendicular to the mandrel or core tube) so that the active fiber length was about 48 cm. The module, containing 19.6 square feet of active area, was encased in a plastic film barrier 3, except for a narrow gap of about ⅛ inch that was left between the film and the tubesheet to allow for gas entrance or exit, and pressure shell 4 to form permeator 1 of the configuration shown in FIG. 1. The composite sulfonated polysulfone (6F-SPS) membrane was post-treated in a conventional manner with a dilute solution of low molecular weight silicone in cyclohexane prior to permeation experiments.

Part D, Operation of the Permeator

The permeator of part C was used to dehydrate an air feed containing approximately 2,300 ppmv of water vapor. The humid air feed was introduced into entrance port 2 at a pressure of 115 psia and a temperature of about 19° C. to 22° C. The sweep fluid comprised dehydrated air with about 1 ppmv of water vapor and it was introduced into the permeator via entrance port 12. The sweep fluid joined and diluted the water vapor enriched permeate gas in the bores of the hollow fibers and flowed concurrently therewith through the bores and countercurrent to the direction of the feed flow. This countercurrent operation allowed for the most efficient gas separation and the nonpermeated dehydrated air stream was recovered via nonpermeate exit port 10. This mode of operation was a shell-side feed mode and the results are those of runs 6 to 26, inclusive of Table I.

The achievable degree of dryness of the nonpermeate gas depends in part on the flow rate of the sweep fluid. A greater volume of sweep fluid will cause a greater dilution of the water vapor in the permeate. Thus the relative water vapor content and partial pressure of water vapor on the permeate side of the membrane skin surface will decrease with increasing sweep fluid flow rate. The purge ratio (sweep fluid flow to nonpermeate fluid flow) was varied between 10% and 40% and over a range of feed flow rates between 10 and 100 liters (STP) per minute. The outlet pressure of the permeate was in all cases maintained at 16 psia.

EXAMPLE 2

In an alternative procedure, the feed gas was introduced into the bore side of the hollow fiber membranes and the sweep fluid was introduced on the exterior or shell side of the hollow fiber membranes. This mode of operation is known as the bore-side feed mode. The permeator of Example 1 was operated under conditions essentially identical to those of Example 1, except that the feed gas was introduced into the bore side of the permeator via port 12. The dehydrated nonpermeate exited at port 16, the sweep gas was introduced via port 2, and the water-enriched permeate exited at port 10. A 20% purge ratio was maintained. As in Example 1, a countercurrent flow pattern was maintained. The results of these experiments are those of Runs 1 to 5, inclusive of Table I.

All results of the drying tests are summarized in Table I, wherein the flow rates of each stream are given in liters at standard temperature and pressure per minute, and the water vapor contents in each stream are given in parts per million by volume (ppmv). The results show that the gas dehydration performance is essentially equivalent whether shell side feed mode or a bore side feed mode of operation is employed. As shown by the experimental data recorded in this table, the method of this invention is highly effective for removal of water vapor from fluid gas streams, being capable of reducing the water vapor content to less than one ppm. From the data reported, the water vapor permeability is readily calculated by one skilled in the art and can be as high as 20 to 30 $ft^3/ft^2 \cdot psi \cdot day$. In a separate air separation experiment, the oxygen permeability for this permeator was found to be 0.0017 $ft^3$ (STP)/$ft^2 \cdot psi \cdot day$, with an oxygen/nitrogen selectivity of about 7.0. The permeator thus exhibited an apparent $H_2O/O_2$ separation factor of about 1,500 and an apparent $H_2O/N_2$ separation factor of about 11,000.

TABLE I

| Run | FLOW RATE[a] | | | | | WATER VAPOR CONTENT (ppm) | | | |
|---|---|---|---|---|---|---|---|---|---|
| | Air* Feed | Sweep Fluid | Permeate | Non-Permeate | Purge Ratio | Air Feed | Sweep Fluid | Permeate | Non-Permeate |
| 1 | 80.8 | 16.1 | 16.4 | 80.5 | 0.20 | 2012 | 1 | 10087 | 11 |
| 2 | 60 | 12. | 12.3 | 59.7 | 0.20 | 2450 | 1 | 10087 | 3.7 |
| 3 | 40.6 | 8. | 8.3 | 40.3 | 0.20 | 2397 | 1 | 10226 | 1.3 |
| 4 | 30.3 | 6 | 6.3 | 30. | 0.20 | 2366 | 1 | 9982 | 0.7 |
| 5 | 20.4 | 4. | 4.4 | 20.4 | 0.20 | 2408 | 1 | 9950 | 0.8 |
| 6 | 10.4 | 2 | 2.4 | 10 | 0.20 | 2221 | 1 | 9417 | 0.8 |
| 7 | 20.3 | 4 | 4.3 | 20 | 0.20 | 2213 | 1 | 9842 | 2.4 |
| 8 | 10.3 | 2.1 | 2.4 | 10 | 0.21 | 2423 | 1 | 9434 | 0.6 |
| 9 | 30.3 | 6.1 | 6.4 | 30 | 0.20 | 2444 | 1 | 10114 | 1 |
| 10 | 40.3 | 8.1 | 8.3 | 40.1 | 0.20 | 2507 | 1 | 9910 | 2.4 |
| 11 | 10.2 | 1 | 1.3 | 9.9 | 0.10 | 2402 | 1 | 14131 | 165 |
| 12 | 20.5 | 2 | 2.4 | 20.1 | 0.10 | 2234 | 1 | 14713 | 320 |
| 13 | 30.4 | 3 | 3.4 | 30 | 0.10 | 2360 | 1 | 14422 | 341 |
| 14 | 10.6 | 1 | 1.4 | 10.2 | 0.10 | — | 1 | — | 202 |

TABLE I-continued

| | FLOW RATE[a] | | | | | WATER VAPOR CONTENT (ppm) | | | |
|---|---|---|---|---|---|---|---|---|---|
| Run | Air* Feed | Sweep Fluid | Permeate | Non-Permeate | Purge Ratio | Air Feed | Sweep Fluid | Permeate | Non-Permeate |
| 15 | 30.4 | 16 | 16.4 | 80 | 0.20 | 2423 | 1 | — | 10 |
| 16 | 10.4 | 3.4 | 3 | 10 | 0.30 | — | 1 | — | 0.4 |
| 17 | 10.4 | 3 | 3.4 | 10 | 0.30 | 2402 | 1 | 7182 | 0.4 |
| 18 | 20.2 | 6 | 6.3 | 19.9 | 0.30 | 2381 | 1 | 7712 | 0.4 |
| 19 | 30.2 | 9 | 9.2 | 30 | 0.30 | 2381 | 1 | 7447 | 0.4 |
| 20 | 40.3 | 12.1 | 12.4 | 40 | 0.30 | 2381 | 1 | 7235 | 0.4 |
| 21 | 60.9 | 18.1 | 18.5 | 60.5 | 0.30 | 2114 | 1 | 7076 | 0.5 |
| 22 | | 24.3 | 22.4 | 80.6 | 0.30 | 2402 | 1 | 6922 | 1 |
| 23 | | 29.6 | 26.8 | 98 | 0.30 | 2339 | 1 | 6828 | 3.6 |
| 24 | 10.4 | 4 | 4.3 | 10.1 | 0.40 | 2465 | 1 | 5698 | 0.3 |
| 25 | 59.7 | 12.2 | 12.2 | 59.7 | 0.20 | — | 1 | — | — |
| 26 | 20.2 | 4.1 | 4.4 | 19.9 | 0.20 | — | 1 | — | 1 |

*Calculated from sweep, permeate, non-permeate mass balance.
[a]In liters (STP) per minute

EXAMPLE 3

Part A, Preparation of Sulfonated Polyarylether Sulfone (SPS)

500 g of Udel 3500, dried at 150° C. overnight, were dissolved in 2600 cc of methylene chloride in a 4-liter pyrex reaction kettle. The dissolved solution was cooled to <5° C. before adding the sulfonating agent, chlorosulfonic acid.

In a 500 ml additional funnel, 112 cc of chlorosulfonic acid were added to 388 cc of methylene chloride (20% V/V). The chlorosulfonic acid-methylene chloride solution was added to the Udel-methylene chloride solution over a period of 90 minutes. The cooling bath was removed after the addition time was completed and the reaction was allowed to continue for an additional two hours. The methylene chloride was decanted and the reddish-brown precipitate was washed 3 times with 2,000 cc of methylene chloride for 15 minutes each at room temperature. The methylene chloride was decanted each time. The sulfonated polysulfone was dissolved in a solvent consisting of 1,000 cc of 2-propanol and 75 cc of deionized water. The gold-colored solution was rotary evaporated at 50° C. to dryness and the sulfonated product dialyzed. The dialyzate was roto-evaporated to dryness. The thus prepared sulfonated polysulfone (SPS) had a determined ion-exchange capacity of 1.95 meq/g of dry polymer in H+ form.

Part B

A composite sulfonated polysulfone (SPS) membrane (SPS) was produced essentially as described in Example 1, part B, except that the coating solution was prepared by dissolving 2 g of SPS polymer, prepared as in part A of this example, in 100 cc of isopropyl alcohol/water mixture 90/10 by volume.

Part C. Preparation of Permeator Device

A helically wound hollow fiber membrane separation device was constructed in the same manner as described in example 1, except that the cartridge surface area was smaller and the composite hollow fibers of part B of this example were used in the cartridge construction. The fibers had an outer diameter of 20.1 mils and an inner diameter of 12.9 mils. The cartridge contained 2.7 square feet of active membrane area. The composite sulfonated poly-sulfone (SPS) membrane was post-treated in a conventional manner except that a dilute solution of low molecular weight aminosilicone was utilized as a post-treating material prior to permeation experiments.

Part D. Operation of the Permeator

The permeator was operated under conditions identical to those of Example 1, except that the purge ratio was constant throughout the test and maintained at 20%. The air drying results are summarized as runs 1 and 2 in Table II. The water permeability is readily calculated from these data to be between 25 and 30 ft$^3$ (STP)/ft$^2$·psi·day, with an oxygen/nitrogen selectivity of 3.6.

In a separate air separation test, the oxygen permeability for this permeator was found to be 0.0047 ft$^3$ (STP)/ft$^2$·psi·day. The apparent $H_2O/O_2$ selectivity was, therefore, about 6,000 and the apparent $H_2O/N_2$ selectivity was about 21,000.

TABLE II

Data of Example 3

| | Flow Rate[a] | | | | | Water Vapor Content (ppmv) | | | |
|---|---|---|---|---|---|---|---|---|---|
| Run | Air* Feed | Sweep Fluid | Permeate | Nonpermeate | Purge Ratio | Air Feed | Sweep Fluid | Permeate | Nonpermeate |
| 1 | 15.9 | 3.18 | 3.18 | 15.9 | 0.20 | 2140 | 1 | 11,200 | 28 |
| 2 | 11.9 | 2.36 | 2.38 | 11.9 | 0.20 | 2220 | 1 | 11,200 | 14 |

[a]In liters (STP) per minute
*Calculated from sweep, permeate, and nonpermeate mass balance

What is claimed is:

1. A gas dehydration process comprising contacting a water vapor-containing feed gas with one side of a composite membrane comprising a porous support and an ultrathin layer of a separation barrier of a sulfonated aromatic polymer having an average molecular weight above about 10,000 and a degree of sulfonation -$S_m$ of from about 0.2 to about 2 selected from the group of sulfonated polysulfone or sulfonated polyether ketone having units:

$$\text{---}(Ar\text{---}y)\text{---}$$

wherein Ar is divalent phenylene or divalent biphenylene and y is:

permeating water vapor contained in said feed gas through said composite membrane and recovering a nonpermeate water vapor-diminished gas stream and a water enriched permeate stream.

2. A gas dehydration process as claimed in claim 1 wherein said separation barrier comprises a sulfonated aromatic polysulfone having in the chain of the polymer molecule the unit:

wherein Ar is as defined in claim 1.

3. A gas dehydration process as claimed in claim 2 wherein said separation barrier comprises a sulfonated aromatic polysulfone having in the chain of the polymer molecule the repeat unit:

wherein A, B, D and E are divalent Ar groups as Ar is defined in claim 1; R and R' can be the same or different and represent an alkyl group or a halogenated alkyl group having from 1 to about 4 carbon atoms; c, d and e are integers having a value of from 0 to 6; n represents the number of repeat units (I) within the average molecular weight of the polymer molecule, which molecular weight is from about 25,000 to about 80,000; and the average degree of sulfonation —$S_m$ is from about 0.2 to about 2.

4. A gas dehydration process as claimed in claim 3 wherein said porous support is a hollow fiber.

5. A gas dehydration process as claimed in claim 4 wherein the separation barrier is sulfonated aromatic polysulfone having a polymer average molecular weight from about 25,000 to about 80,000, and an average degree of sulfonation —$S_m$ of from about 0.4 to about 1.5.

6. A gas dehydration process as claimed in claim 5 wherein R and R' are methyl.

7. A gas dehydration process as claimed in claim 6, wherein a sweep fluid having a lower water vapor concentration than the water vapor concentration in the feed gas is contacted with and mixes and flows in concurrent flow with the water-enriched permeated gas stream on one side of said composite membrane and in countercurrent flow to the non-permeate water-diminished dehydrated gas stream on the other side of said composite membrane, said sweep stream assisting removal of water vapor-enriched permeate gas stream from the permeator containing said composite membrane.

8. A gas dehydration process as claimed in claim 5 wherein the ultrathin layer of the separation barrier of the composite membrane comprises a thin coating of less than about 10,000 Angstroms thick comprised of 50 percent or more by weight of said sulfonated aromatic polysulfone.

9. A gas dehydration process as claimed in claim 8, wherein a sweep fluid having a lower water vapor concentration than the water vapor concentration in the feed gas is contacted with and mixes and flows in concurrent flow with the water-enriched permeated gas stream on one side of said composite membrane and in countercurrent flow to the non-permeate water-diminished dehydrated gas stream on the other side of said composite membrane, said sweep stream assisting removal of water vapor-enriched permeate gas stream from the permeator containing said composite membrane.

10. A gas dehydration process as claimed in claim 5, wherein a sweep fluid having a lower water vapor concentration than the water vapor concentration in the feed gas is contacted with and mixes and flows in concurrent flow with the water-enriched permeated gas stream on one side of said composite membrane and in countercurrent flow to the non-permeate water-diminished dehydrated gas stream on the other side of said composite membrane, said sweep stream assisting removal of water vapor-enriched permeate gas stream from the permeator containing said composite membrane.

11. A gas dehydration process as claimed in claim 4 wherein R and R' are methyl.

12. A gas dehydration process as claimed in claim 11, wherein a sweep fluid having a lower water vapor concentration than the water vapor concentration in the feed gas is contacted with and mixes and flows in concurrent flow with the water-enriched permeated gas stream on one side of said composite membrane and in countercurrent flow to the non-permeate water-diminished dehydrated gas stream on the other side of said composite membrane, said sweep stream assisting removal of water vapor-enriched permeate gas stream from the permeator containing said composite membrane.

13. A gas dehydration process as claimed in claim 4, wherein a sweep fluid having a lower water vapor concentration than the water vapor concentration in the feed gas is contacted with and mixes and flows in cocurrent flow with the water-enriched permeated gas stream on one side of said composite membrane and in countercurrent flow to the non-permeate water-diminished dehydrated gas stream on the other side of said composite membrane, said sweep stream assisting removal of water vapor-enriched permeate gas stream from the permeator containing said composite membrane.

14. A gas dehydration process as claimed in claim 3 wherein the feed gas comprises water vapor-containing air stream.

15. A gas dehydration process as claimed in claim 14 wherein R and R' are methyl.

16. A gas dehydration process as claimed in claim 15, wherein a sweep fluid having a lower water vapor concentration than the water vapor concentration in the feed gas in contacted with and mixes and flows in cocurrent flow with the water-enriched permeated gas stream on one side of said composite membrane and in countercurrent flow to the non-permeate water-diminished dehydrated gas stream on the other side of said composite membrane, said sweep stream assisting removal of water vapor-enriched permeate gas stream from the permeator containing said composite membrane.

17. A gas dehydration process as claimed in claim 14, where a sweep fluid having a lower water vapor concentration than the water vapor concentration in the feed gas is contacted with and mixes and flows in cocurrent flow with the water-enriched permeated gas stream on one side of said composite membrane and in countercurrent flow to the non-permeate water-diminished dehydrated gas stream on the other side of said composite membrane, said sweep stream assisting removal of water vapor-enriched permeate gas stream from the permeator containing said composite membrane.

18. A gas dehydration process as claimed in claim 3 wherein R and R' are methyl.

19. A gas dehydration process as claimed in claim 18, wherein a sweep fluid having a lower water vapor concentration than the water vapor concentration in the feed gas is contacted with and mixes and flows in cocurrent flow with the water-enriched permeated gas stream on one side of said composite membrane and in countercurrent flow to the non-permeate water-diminished dehydrated gas stream on the other side of said composite membrane, said sweep stream assisting removal of water vapor-enriched permeate gas stream from the permeator containing said composite membrane.

20. A gas dehydration process as claimed in claim 3, wherein a sweep fluid having a lower water vapor concentration than the water vapor concentration in the feed gas is contacted with and mixes and flows in cocurrent flow with the water-enriched permeated gas stream on one side of said composite membrane and in countercurrent flow to the non-permeate water-diminished dehydrated gas stream on the other side of said composite membrane, said sweep stream assisting removal of water vapor-enriched permeate gas stream from the permeator containing said composite membrane.

21. A gas dehydration process as claimed in claim 2 wherein said sulfonated polysulfone contains in the chain of the polymer molecule the repeat unit:

(II)

wherein Ar is a divalent phenylene group.

22. A gas dehydration process as claimed in claim 2 wherein said sulfonated polysulfone contains in the chain of the polymer molecule the repeat unit:

(III)

wherein Ar is a divalent phenylene group.

23. A gas dehydration process as claimed in claim 2 wherein said sulfonated polysulfone contains in the chain of the polymer molecule the repeat unit:

(IV)

wherein Ar is a divalent phenylene group.

24. A gas dehydration process as claimed in claim 23 wherein said porous support is a hollow fiber.

25. A gas dehydration process as claimed in claim 24 wherein the separation barrier is sulfonated polysulfone having a polymer average molecular weight from about 25,000 to about 80,000 and an average degree of sulfonation $-S_m$ of from about 0.4 to about 1.5.

26. A gas dehydration process as claimed in claim 25 wherein the ultrathin layer of the separation barrier of the composite membrane comprises a thin coating of less than about 10,000 Angstroms thick comprised of 50 percent or more by weight of said sulfonated aromatic polysulfone.

27. A gas dehydration process as claimed in claim 26, wherein a sweep fluid having a lower water vapor concentration than the water vapor concentration in the feed gas is contacted with and mixes and flows in cocurrent flow with the water-enriched permeated gas stream on one side of said composite membrane and in countercurrent flow to the non-permeate water-diminished dehydrated gas stream on the other side of said composite membrane, said sweep stream assisting removal of water vapor-enriched permeate gas stream from the permeator containing said composite membrane.

28. A gas dehydration process as claimed in claim 25, wherein a sweep fluid having a lower water vapor concentration than the water vapor concentration in the feed gas is contacted with and mixes and flows in cocurrent flow with the water-enriched permeated gas stream on one side of said composite membrane and in countercurrent flow to the non-permeate water-diminished dehydrated gas stream on the other side of said composite membrane, said sweep stream assisting removal of water vapor-enriched permeate gas stream from the permeator containing said composite membrane.

29. A gas dehydration process as claimed in claim 24, wherein a sweep fluid having a lower water vapor concentration than the water vapor concentration in the feed gas is contacted with and mixes and flows in cocurrent flow with the water-enriched permeated gas stream on one side of said composite membrane and in countercurrent flow to the non-permeate water-diminished dehydrated gas stream on the other side of said composite membrane, said sweep stream assisting removal of water vapor-enriched permeate gas stream from the permeator containing said composite membrane.

30. A gas dehydration process as claimed in claim 23 wherein the feed gas comprises water vapor-containing air stream.

31. A gas dehydration process as claimed in claim 30, wherein a sweep fluid having a lower water vapor concentration than the water vapor concentration in the feed gas is contacted with and mixes and flow sin cocurrent flow with the water-enriched permeated gas stream on one side of said composite membrane and in countercurrent flow to the non-permeate water-diminished dehydrated gas stream on the other side of said composite membrane, said sweep stream assisting removal of water vapor-enriched permeate gas stream from the permeator containing said composite membrane.

32. A gas dehydration process as claimed in claim 2 wherein said porous support is a hollow fiber.

33. A gas dehydration process as claimed in claim 23, wherein a sweep fluid having a lower water vapor concentration than the water vapor concentration in the feed gas is contacted with and mixes and flows in cocurrent flow with the water-enriched permeated gas stream on one side of said composite membrane and in countercurrent flow to the non-permeate water-diminished dehydrated gas stream on the other side of said composite membrane, said sweep stream assisting removal of water vapor-enriched permeate gas stream from the permeator containing said composite membrane.

34. A gas dehydration process as claimed in claim 2, wherein a sweep fluid having a lower water vapor concentration than the water vapor concentration in the feed gas is contacted with an mixes and flows in cocurrent flow with the water-enriched permeated gas stream on one side of said composite membrane and in countercurrent flow to the non-permeate water-diminished dehydrated gas stream on the other side of said composite membrane, said sweep stream assisting removal of water vapor-enriched permeate gas stream from the permeator containing said composite membrane.

35. A gas dehydration process as claimed in claim 1 wherein said separation barrier comprises a sulfonated aromatic polyether ketone having in the chain of the polymer molecule the unit:

wherein Ar is as defined in claim 1.

36. A gas dehydration process as claimed in claim 35 wherein said sulfonated polyether ketone contains in the chain of the polymer molecule the repeat unit:

wherein Ar is a divalent phenylene group and n represents the number of repeat units within the average molecular weight of the polymer molecule, which molecular weight is from about 25,000 to about 80,000.

37. A gas dehydration process as claimed in claim 36 wherein said porous support is a hollow fiber.

38. A gas dehydration process as claimed in claim 37 wherein the separation barrier is sulfonated polyether ketone having a polymer average molecular weight from about 25,000 to about 80,000 and an average degree of sulfonation —$S_m$ of from about 0.4 to about 1.5.

39. A gas dehydration process as claimed in claim 38 wherein the ultrathin layer of the separation barrier of the composite membrane comprises a thin coating of less than about 10,000 Angstroms thick comprised of 50 percent or more by weight of said sulfonated aromatic polyether ketone.

40. A gas dehydration process as claimed in claim 39, wherein a sweep fluid having a lower water vapor concentration than the water vapor concentration in the feed gas is contacted with and mixes and flows in cocurrent flow with the water-enriched permeated gas stream on one side of said composite membrane and in countercurrent flow to the non-permeate water-diminished dehydrated gas stream on the other side of said composite membrane, said sweep stream assisting removal of water vapor-enriched permeate gas stream from the permeator containing said composite membrane.

41. A gas dehydration process as claimed in claim 38, wherein a sweep fluid having a lower water vapor concentration than the water vapor concentration in the feed gas is contacted with and mixes and flows in cocurrent flow with the water-enriched permeated gas stream on one side of said composite membrane and in countercurrent flow to the non-permeate water-diminished dehydrated gas stream on the other side of said composite membrane, said sweep stream assisting removal of water vapor-enriched permeate gas stream from the permeator containing said composite membrane.

42. A gas dehydration process as claimed in claim 37, wherein a sweep fluid having a lower water vapor concentration than the water vapor concentration in the feed gas is contacted with and mixes and flows in cocurrent flow with the water-enriched permeated gas stream on one side of said composite membrane and in countercurrent flow to the non-permeate water-diminished dehydrated gas stream on the other side of said composite membrane, said sweep stream assisting removal of water vapor-enriched permeate gas stream from the permeator containing said composite membrane.

43. A gas dehydration process as claimed in claim 26 wherein the feed gas comprises water vapor-containing air.

44. A gas dehydration process as claimed in claim 43, wherein a sweep fluid having a lower water vapor concentration than the water vapor concentration in the feed gas is contacted with and mixes and flows in cocurrent flow with the water-enriched permeated gas stream on one side of said composite membrane and in countercurrent flow to the non-permeate water-diminished dehydrated gas stream on the other side of said composite membrane, said sweep stream assisting removal of water vapor-enriched permeate gas stream from the permeator containing said composite membrane.

45. A gas dehydration process as claimed in claim 36, wherein a sweep fluid having a lower water vapor concentration than the water vapor concentration in the feed gas is contacted with and mixes and flows in cocurrent flow with the water-enriched permeated gas stream on one side of said composite membrane and in countercurrent flow to the non-permeate water-diminished dehydrated gas stream on the other side of said composite membrane, said sweep stream assisting removal of water vapor-enriched permeate gas stream from the permeator containing said composite membrane.

46. A gas dehydration process as claimed in claim 35, wherein said porous support is a hollow fiber.

47. A gas dehydration process as claimed in claim 35, wherein a sweep fluid having a lower water vapor concentration than the water vapor concentration in the feed gas is contacted with and mixes and flows in cocurrent flow with the water-enriched permeated gas stream on one side of said composite membrane and in countercurrent flow to the non-permeate water-diminished dehydrated gas stream on the other side of said composite membrane, said sweep stream assisting removal of water vapor-enriched permeate gas stream from the permeator containing said composite membrane.

48. A gas dehydration process as claimed in claim 1 wherein said porous support is a hollow fiber.

49. A gas dehydration process as claimed in claim 48 wherein the separation barrier is sulfonated aromatic polymer having an average molecular weight from about 25,000 to about 80,000 and an average degree of sulfonation —$S_m$ of from about 0.4 to about 1.5.

50. A gas dehydration process as claimed in claim 49 wherein the ultrathin layer of the separation barrier of the composite membrane comprises a thin coating less than about 10,000 Angstroms thick comprised of 50 percent or more by weight of said sulfonated aromatic polymer.

51. A gas dehydration process as claimed in claim 50, wherein a sweep fluid having a lower water vapor concentration than the water vapor concentration in the feed gas is contacted with and mixes and flows in cocurrent flow with the water-enriched permeated gas stream on one side of said composite membrane and in countercurrent flow to the non-permeate water-diminished dehydrated gas stream on the other side of said composite membrane, said sweep stream assisting removal of water vapor-enriched permeate gas stream from the permeator containing said composite membrane.

52. A gas dehydration process as claimed in claim 49, wherein a sweep fluid having a lower water vapor concentration than the water vapor concentration in the feed gas is contacted with and mixes and flows in cocurrent flow with the water-enriched permeated gas stream on one side of said composite membrane and in countercurrent flow to the non-permeate water-diminished dehydrated gas stream on the other side of said composite membrane, said sweep stream assisting removal of water vapor-enriched permeate gas stream from the permeator containing said composite membrane.

53. A gas dehydration process as claimed in claim 48, wherein a sweep fluid having a lower water vapor concentration than the water vapor concentration in the feed gas is contacted with and mixes and flows in cocurrent flow with the water-enriched permeated gas stream on one side of said composite membrane and in countercurrent flow to the non-permeate water-diminished dehydrated gas stream on the other side of said composite membrane, said sweep stream assisting removal of water vapor-enriched permeate gas stream from the permeator containing said composite membrane.

54. A gas dehydration process as claimed in claim 1 wherein the feed gas comprises water vapor-containing air stream.

55. A gas dehydration process as claimed in claim 54, wherein a sweep fluid having a lower water vapor concentration than the water vapor concentration in the feed gas is contacted with and mixes and flows in cocurrent flow with the water-enriched permeated gas stream on one side of said composite membrane and in countercurrent flow to the non-permeate water-diminished dehydrated gas stream on the other side of said composite membrane, said sweep stream assisting removal of water vapor-enriched permeate gas stream from the permeator containing said composite membrane.

56. A gas dehydration process as claimed in claim 1, wherein a sweep fluid having a lower water vapor concentration than the water vapor concentration in the feed gas is contacted with and mixes and flows in cocurrent flow with the water-enriched permeated gas stream on one side of said composite membrane and in countercurrent flow to the non-permeate water-diminished dehydrated gas stream on the other side of said composite membrane, said sweep stream assisting removal of water vapor-enriched permeate gas stream from the permeator containing said composite membrane.

* * * * *